United States Patent [19]
Moake

[11] Patent Number: 6,051,830
[45] Date of Patent: Apr. 18, 2000

[54] METHOD FOR STABILIZING A SCINTILLATION DETECTOR

[75] Inventor: Gordon L. Moake, Houston, Tex.

[73] Assignee: Halliburton Energy Services, Inc., Houston, Tex.

[21] Appl. No.: 09/038,212

[22] Filed: Mar. 11, 1998

[51] Int. Cl.$^7$ ............... G01V 5/12; G01V 5/04
[52] U.S. Cl. ............ 250/252.1; 250/261; 250/256
[58] Field of Search ............... 250/252.1, 253, 250/261, 262, 267, 269.1, 269.3, 256

[56] References Cited

U.S. PATENT DOCUMENTS

| | | | |
|---|---|---|---|
| 3,862,417 | 1/1975 | Kampfer | 250/263 |
| 3,922,541 | 11/1975 | Seeman | 250/256 |
| 4,053,767 | 10/1977 | Kampfer et al. | 250/252 |
| 4,272,677 | 6/1981 | Berthold et al. | 250/252 |
| 4,300,043 | 11/1981 | Robbins | 250/262 |
| 4,450,354 | 5/1984 | Smith, Jr. et al. | 250/256 |
| 4,825,073 | 4/1989 | Smith, Jr. et al. | 250/260 |
| 5,171,986 | 12/1992 | Loomis et al. | 250/252.1 |
| 5,180,917 | 1/1993 | Wraight | 250/374 |
| 5,272,336 | 12/1993 | Moake | 250/261 |
| 5,360,975 | 11/1994 | Stoller | 250/262 |
| 5,459,314 | 10/1995 | Plasek | 250/269.7 |
| 5,600,135 | 2/1997 | Jacobson | 250/261 |
| 5,706,003 | 1/1998 | Kurkoski | 341/118 |
| 5,912,460 | 6/1999 | Stoller et al. | 250/269.3 |

OTHER PUBLICATIONS

W. E. Schultz, et al; Dual–Detector Lithology Measurements with a New Spectral Density Log; Welex, a Halliburton Company; 26$^{th}$ Annual SPWLA Symposium, Dallas, Tx. Jun. 1985 (pp. 1–20).

G. L. Moake; A New Approach to Determining Compensated Density and $P_e$ Values with a Spectral–Density Tool; Halliburton Logging Services, Inc.; 32$^{nd}$ Annual SPWLA Logging Symposium; Jun. 6–19, 1991; (pp. 1–23).

*Primary Examiner*—Constantine Hannaher
*Assistant Examiner*—Albert Gagliardi
*Attorney, Agent, or Firm*—Conley, Rose & Tayon, P.C.

[57] ABSTRACT

A method for calibrating a logging tool that is exposed to an external energy spectrum, comprising the steps of: (a) providing a stabilization source that emits a stabilization signal having a known energy; (b) providing a receiver that receives a total spectrum that comprises the sum of the external energy spectrum and the received stabilization signal; (c) discerning the stabilization signal in the total spectrum by the steps of: calculating the centroid of the area under the total spectrum; adjusting the gain of the tool on the basis of the calculated centroid; dividing a portion of the spectrum that includes the known energy level of the stabilization peak into a number of windows of equal width, with an equal number of windows on either side of the stabilization peak energy; using the count rates in each of the windows to calculate a value $D_n$ that is proportional to the $n^{th}$ derivative of the spectrum at the stabilization peak energy; and adjusting the gain of the tool on the basis of the value of $D_n$.

30 Claims, 3 Drawing Sheets

METHOD FOR STABILIZING A SCINTILLATION DETECTOR

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The present invention relates generally to gamma density logging tools and more particularly to a novel technique for stabilizing such detectors. Still more particularly, the present invention comprises a method for more accurately adjusting the gain of a stabilizer so that the center of the stabilization peak is positioned at a desired energy level.

Gamma density logging is well known in the art of petroleum drilling. In gamma density logging, a source of gamma rays is lowered into the hole, along with at least one, and more typically at least two gamma ray detectors. Each detector typically comprises a large thallium-doped sodium iodide NaI(Tl) crystal coupled to a low-noise photomultiplier. The incidence of gamma rays on the detectors, along with known information about the respective distances of each detector from the GR source, gives information about the effect of the surrounding formation on the gamma rays as they are transmitted from the source to the detectors, and thus gives information about the formation itself.

In nuclear radiation measurement techniques and also in photometry use is made of detectors such as scintillation counters, proportionally counter tubes, semiconductors, or photomultipliers having internal amplification, which supply pulses whose pulse amplitude corresponds to the energy absorbed by the detector. Gamma density logging tools typically use a gamma ray source in conjunction with one or more scintillation counters. Gamma rays from the source are emitted into the formation surrounding the tool. The formation scatters the gamma rays, causing some of them to return to the tool and impact the scintillation counters. The counters convert energy from these incident gamma rays into light, which is in turn detected and amplified by a photomultiplier, which emits a signal corresponding to the energy of the incident gamma rays.

A particular difficulty arises as a result of drift in such radiation measurement means, especially because of variations in internal amplification. These variations are particularly severe as the temperature of the tool rises. These variations gives rise to variations in pulse heights and consequently to a displacement of the energy lines or energy peaks with respect to the adjusted response thresholds of pulse registration, and hence to inaccurate measurements of intensity. The variations can be kept within acceptable limits by regular checking with calibrating radiation sources and adjustment of the tool. However, periodic calibration of the energy spectrum with external sources is not possible when the tool is in use (logging). For this reason, and because the gain changes due to elevated temperatures in a well can be quite large, automatic control methods and devices for stabilization of drift are preferred.

In order to avoid the disadvantages associated with drift, it is desirable to use a peak of the pulse amplitude spectrum as the controlling variable in automatic stabilization techniques. For this to be possible, the pulse amplitude spectrum of the radiation must have a peak that is discernable and suitable for control purposes.

Typical gamma-ray logging tools use a cesium-137 gamma source and two density detectors spaced apart from the source. Cesium-137 emits gamma rays with an energy of 662 keV. The standard means for stabilizing such a detector in a gamma-gamma density tool is to place a small cesium-137 source on or near the surface of each detector. A representative spectrum of the stabilization source energies detected at the far detector is shown in FIG. 1. It can be seen that there is a clear peak at 662 keV, but there are also a large number of counts at lower energy levels, which correspond to smaller amounts of energy that were absorbed in the scintillation crystal.

In operation, the observed spectrum for a tool of this sort comprises the sum of the logging and stabilization spectra. Fortunately, the energy loss in the formation is great enough that the energy of the gamma rays detected after passage through the formation is much lower than their original energy, as shown in FIG. 2. In contrast, the energy of the gamma rays originating at the stabilization source does not pass through the formation and so is virtually unchanged when it is detected. The observed spectrum thus includes a stabilization peak at 662 keV superimposed on a spectrum having a much larger peak at lower energies, as in the spectrum of FIG. 3, in which the portion of the spectrum between 40 and 400 keV is off the scale.

It is presently known to use a two step process for distinguishing the stabilization peak from the rest of the spectrum. The two steps entail (1) adjusting the gain of the system so as to place the stabilization peak at approximately 662 keV and (2) adjusting the gain until the count rate in the energy range from 617 to 662 keV is the same as the count rate in the energy range from 662 to 708 keV. Step (1) is carried out by positioning the peak such that there are enough counts above 617 keV to ensure that the stabilization peak is above that point and so few counts above 708 to ensure that the peak is below that point.

Successful use of this technique depends on three factors. First, there must be relatively few counts above the stabilization peak. Second there must be a well-defined valley between the logging spectrum and the stabilization peak, and third, the stabilization peak must be easily distinguished in the spectrum. In theory, these three conditions can always be met by increasing the strength of the stabilization source. Increasing the strength of the stabilization source also increases the fraction of the spectrum that corresponds to the stabilization source, however. Since the stabilization spectrum extends into the energy region that is used to compute formation density, the portion of the spectrum that is attributable to the stabilization source must be subtracted from the observed spectrum to allow calculation of the formation density. Thus, as the strength of the stabilization source increases, the statistical uncertainty of the desired calculations also increases. This is particularly disadvantageous in situations where the overall spectrum has a low count rate, such as in logging while drilling (LWD) applications and in cased-hole density tools.

Cased-hole density measurements are particularly difficult, since the tool must operate in both very high- and very low-count-rate situations. This is because gamma rays are attenuated exponentially with the density of the rock. High-density formations, such as carbonates, attenuate gamma rays quickly. However, very low density formations, such as coal, attenuate the gamma rays much less. Thus, if a detector far from the source is large enough to detect a reasonable number of counts per second in a dense rock, it will detect many times more counts in a low-density rock. If the tool is used in open holes without casing, the fractional difference between high-density formations behind casing and low-density formations in open holes is even greater, since the casing also causes significant attenuation. Even if the tool is not used in open holes, it is desirable to calibrate it in existing calibration fixtures, which have no casing. Hence, the tool must be able to operate under a wide range of conditions.

Furthermore, if the tool uses a cobalt-60 logging source, which emits gamma rays of 1.17 and 1.33 MeV, the high-count-rate situations have a significant number of counts at energies in the region above 662 keV. FIG. 4, which is an example of an observed spectrum for the third detector of a cased-hole density tool placed in a magnesium block, illustrates the nature of this problem. As can be seen, there are a significant number of counts above 662 keV and there is no well-defined valley between the stabilization peak and the logging spectrum. In situations like this, the conventional two-step technique described above for adjusting gain will not work. In addition, because the stabilization peak is obscured by a large, nonlinear background, the technique of balancing the count rates immediately above and below 662 keV will result in a miscalibrated instrument.

Hence, it is desired to provide a stabilization technique that is effective in situations where there are a significant number of counts above 662 keV, where there is no well-defined valley between the stabilization peak and the logging spectrum, and/or where the stabilization peak is obscured by a large, nonlinear background. The stabilization technique should require sufficiently few calculations as to be operable in the logging context and should be consistently accurate in a variety of logging situations.

BRIEF SUMMARY OF THE INVENTION

The present invention comprises a method and system for discerning and calibrating the stabilization peak in a gamma density logging tool. The method includes the steps of locating the centroid of the entire detected spectrum and fine tuning the location of the stabilization peak using the third derivative of the stabilization peak.

The present method provides the advantage of being equally effective in both low and high count rate situations. Another advantage of the present method is that it accurately locates the stabilization peak even in situations where there are significant amounts of energy above the stabilization peak, where no well-defined valley sets off the stabilization peak, and where a large non-linear background obscures the stabilization peak.

BRIEF DESCRIPTION OF THE DRAWINGS

For a more detailed description of the preferred embodiment of the present invention, reference will now be made to the accompanying drawings, wherein.

DETAILED DESCRIPTION OF THE INVENTION

Figure 3:
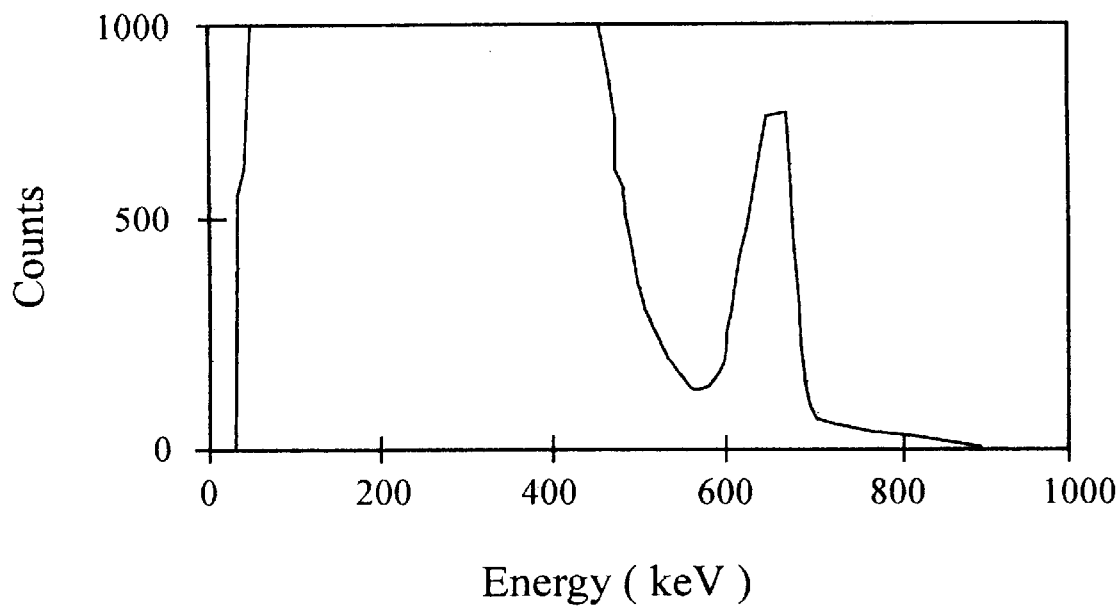
FIG. 3 is a combined logging and stabilization spectrum from the far detector of a density tool in a magnesium block.
Figure 4:
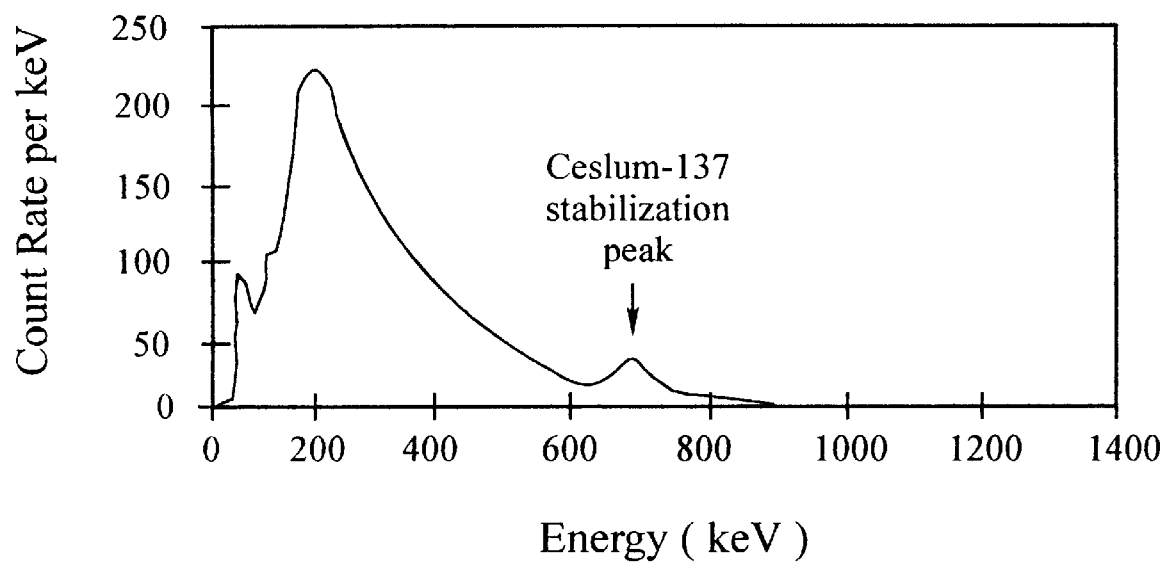
FIG. 4 is a an example of an observed (combined) spectrum for the third detector of a cased-hole density tool placed in a magnesium block.

The present invention comprises a technique for processing logging data from a stabilized source. Thus, the input data may resemble the spectra shown in FIGS. 3 and 4, discussed above. Two objectives of the technique are to discern the stabilization peak and to accurately position it at 662 keV. The present technique uses two steps, both of which are different from the steps of previously known stabilization techniques.

The first step of the present technique entails positioning the peak at approximately the correct position by computing the centroid of the area under the entire spectrum curve. This is effective because the shape of the observed logging spectrum is relatively insensitive to the density and lithology of the formation, so that the spectra of various formations should have centroids at approximately the same energy.

Figure 5:
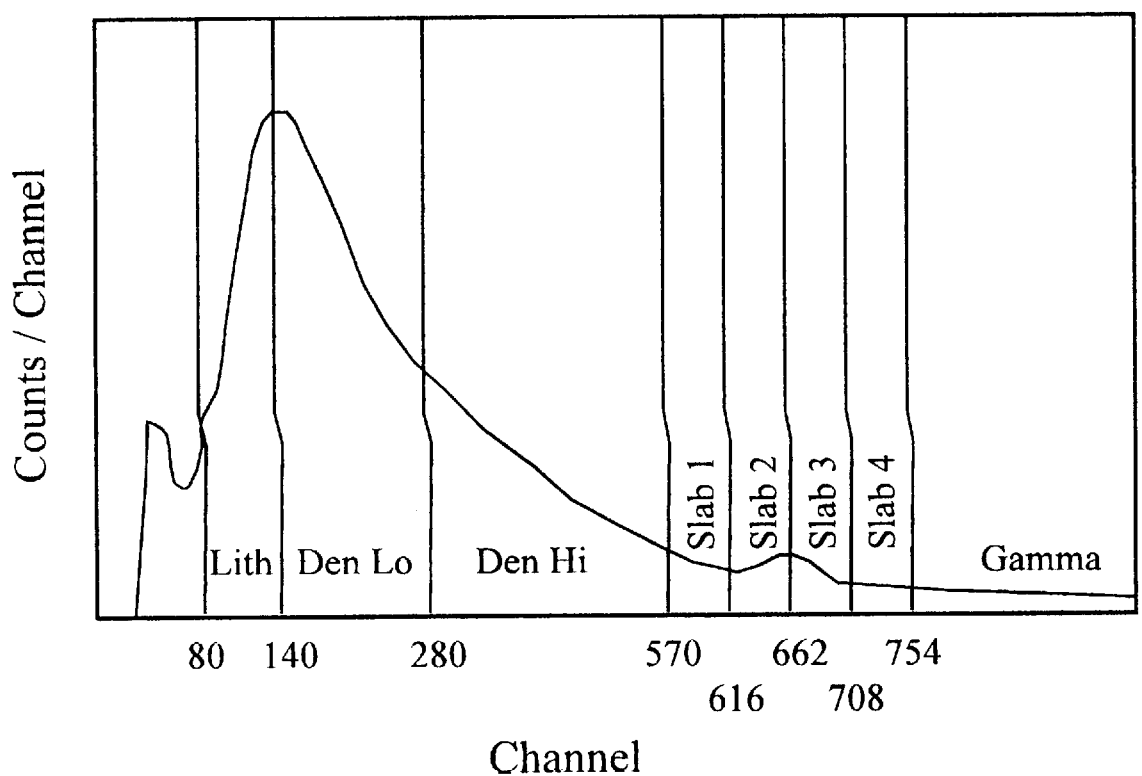
FIG. 5 is an annotated combined spectrum illustrating the technique of the present invention.

The centroid of the spectrum is calculated by first dividing the spectrum into a plurality of contiguous energy windows that together span most of the spectrum. While it is preferable to use a large number of windows that span the entire spectrum, this must be balanced against the advantages of simplifying the necessary computation. In view of these competing considerations, it has been found that a preferred number of windows is between 8 and 16. The highest-energy window preferably encompasses all energies above its threshold. The lower end of the lowest-energy window must be set above the noise threshold for that detector and its expected operating range. This is typically about 40 kev. An example of a suitable division is illustrated in FIG. 5.

Once the windows have been set, the centroid is calculated. According to a preferred embodiment, the centroid is calculated according to the following equation:

$$\text{centroid} = \frac{\sum_i y_i x_i}{\sum_i y_i}$$

where $x_i$ is the energy of window i and $y_i$ is the count rate in that window. The calculated centroid is compared to a predicted nominal value, and the difference is used to adjust the gain of the instrument. The nominal position for the centroid depends on the detector geometry and tool design. It is determined by acquiring data in a wide range of formations, adjusting the gain of the measured spectrum so that the location of the stabilization peak is at the desired value, and then computing the centroid. The range of centroids determined for the various formations is then used to generate a nominal centroid position for a given formation.

According to one embodiment, a preferred first step is to determine whether the stabilization peak is close enough to the desired (nominal) position to allow the first (coarse) tuning step to be omitted, in which case the third derivative can be used to fine-tune the stabilization. This determination can be made by examining the count rates in the windows Stab1 and above (FIG. 5). For instance, if the Gamma window has more than some minimum fraction of the total counts, if Stab2+Stab3 have many fewer counts than are expected in the stabilization peak, or if Stab4 counts are greater than those in Stab3, then the peak is clearly not close enough to its target value. On the other hand, if Stab1 is less than Stab2 or Stab2 is less than 0.92×Stab3, then the peak is close enough to be fine tuned, as described below. If the peak is not close enough, the centroid is first adjusted in a coarse tuning step as follows.

The centroid is adjusted linearly in proportion to the ratio of the difference between the calculated and nominal values of the centroid to the calculated centroid value. For example, if the calculated centroid occurs at 200 keV and the nominal value is 250 keV, it is necessary to increase the gain by 25 percent [(250−200)/200]. Because the centroid calculation is not precise, this process of calculating the centroid and adjusting the gain is preferably iterated until the difference between the calculated centroid and the nominal value is small, such as on the order of four percent (4%) of the nominal value. Alternatively, a predefined narrow target range that includes the nominal value can be used, with the gain being adjusted until the calculated centroid falls within this range. By way of example only, the target range can be defined as the nominal value plus or minus 5 keV. A narrower target range, such as the nominal value plus or minus 2 keV could alternatively be used.

After this step is completed, it may be necessary to make additional minor adjustments to account for small variations in the shape of the spectrum prior to completion of the coarse adjustment step. One of two types of adjustment is preferably used. One type of adjustment applies in the case where the measured spectrum includes only the stabilization source and no logging source is present. This condition occurs when the background spectrum is being measured during the calibration procedure. If the total count rate is so low that no logging source is likely to be present, the spectrum is shifted an additional amount, based on a knowledge of where the centroid for the stabilization peak should be.

A second type of adjustment may be required to account for spectral shifts due to the lithology of the formation. This adjustment can be based on the ratio of the count rates in a pre-selected low-energy window to a pre-selected high-energy window. For example, the ratio of the total count rate in the window labeled DenHi in FIG. 5 to the total count rate in the window labeled DenLo can be used. If the ratio is lower than a predetermined nominal value, the gain should be increased to compensate for the shape of the spectrum and, conversely, if the ratio is greater than a predetermined nominal value, the gain should be decreased.

Since the coarse tuning step uses the centroid of the peak to approximate the peak position, it does not require either small count rates above 708 keV or a well-defined valley between the stabilization peak and the bulk of the logging spectrum.

Figure 1:
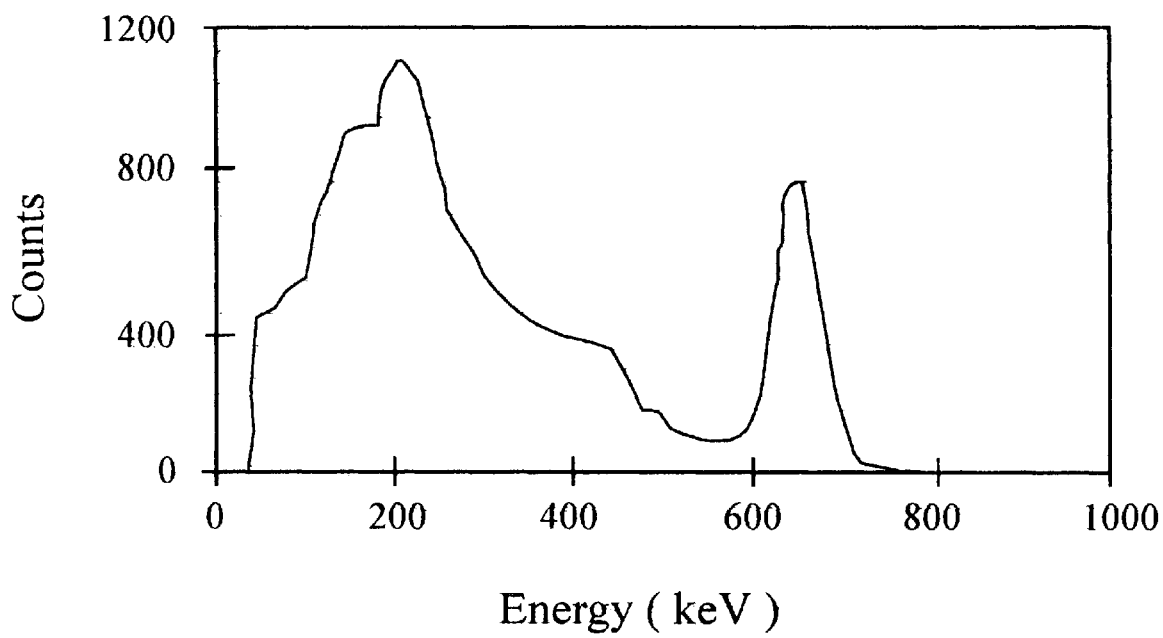
FIG. 1 is a typical spectrum of energy from a stabilization source placed on the far detector of a wireline density tool.
Figure 2:
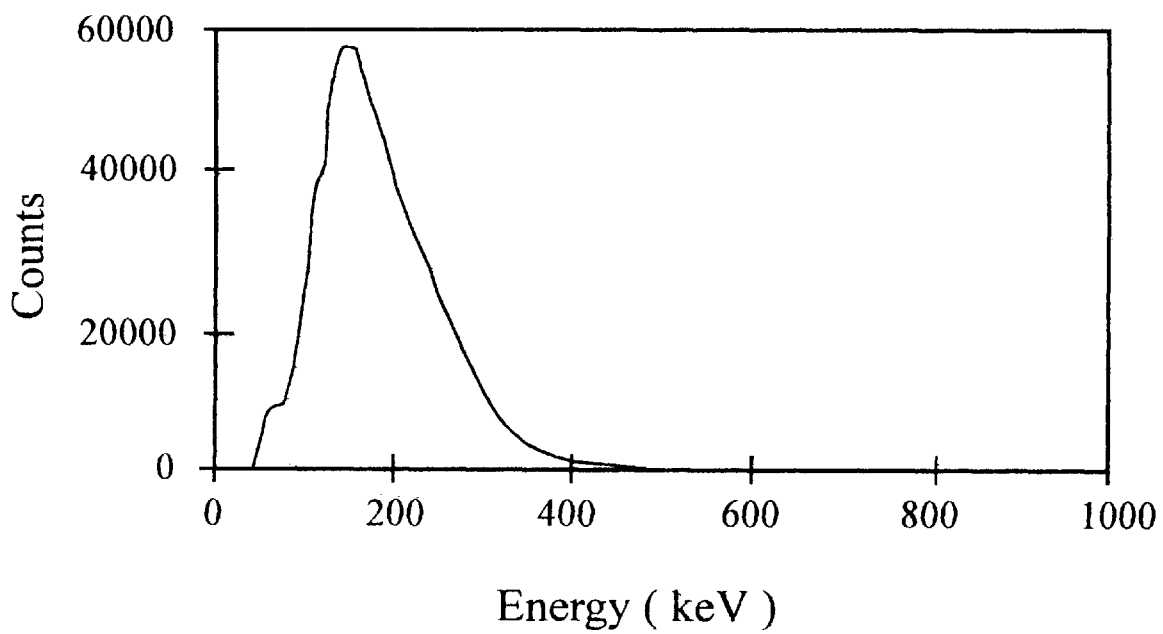
FIG. 2 is a logging spectrum from the far detector of a wireline density tool that is placed in a magnesium block.

Once the gain has been adjusted coarsely in this manner, the windows labeled Stab1 to Stab4 in FIG. 5 are used to fine tune the stabilization. The windows Stab1 through Stab4 are preferably selected so that they are contiguous, of equal width, and positioned so that Stab1 and Stab2 are on one side of 662 keV and Stab3 and Stab4 are on the opposite side of 662 keV, as shown in FIG. 5. A preferred width for each of windows Stab1 through Stab4 is equal to from about 0.5 to about 1.5 times the width of the stabilization peak at one-half of its maximum value ("full width at half max," hereinafter "W"). The width of the windows is preferably about 1.25 times the full width at half max (1.25 W). This quantity can be generated from measurements of the stabilization peak alone, in the absence of a logging signal, such as is shown in FIG. 1. Alternatively, in many instances, the width of windows Stab1 through Stab4 can be set quantitatively, such as for example, in the range of from about 30 keV to about 80 keV, with a preferred width being approximately 45±5 keV.

According to a preferred embodiment, the count rates from these windows are preferably combined to yield a quantity $D_3$ that is proportional to the third derivative. While any analysis of the count rates in the Stab windows that yields a value for $D_3$ that is proportional to the third derivative can be used, a preferred equation for calculating $D_3$ is as follows:

$$D_3 = \text{Stab1} - 3\text{Stab2} + 3\text{Stab3} - \text{Stab4},$$

Since the stabilization peak is symmetric, its third derivative at 662 keV is zero. Thus, the gain is adjusted until $D_3$ equals zero. Because the third derivative of a quadratic is also zero, this technique will place the center of the stabilization peak at 662 keV, even if it is superimposed on a relatively large quadratic background. Hence, even relatively small stabilization peaks are discernible and useable, with the result that tools using the present technique can operate with much smaller stabilization sources than were previously useful.

Alternatively, the mathematical techniques for fine tuning the tool can be varied without departing from the concepts of the present invention. For example, other derivatives can be used. It is preferred that odd-ordered derivatives be used, so the derivative will equal zero at the stabilization peak. Also, an even number of windows is required to compute an odd derivative.

For example, using the first derivative requires only two windows, Stab1 and Stab2, and gives a value for $D_1$ according to the equation:

$$D_1 = \text{Stab1} - \text{Stab2}$$

Using this analysis, $D_1$ will be zero at the peak only if there is no background noise. Because there is typically some level of background noise, use of the first derivative is not preferred.

Higher-order derivatives can also be used, but t hey require more windows and the statistical uncertainty of the measurement increases. The advantage of higher orders is that the higher the order, the more rapidly the background can vary without affecting the measurement of the derivative. Examples of higher-order equations are:

$$D_5 = \text{Stab1} - 5\text{Stab2} + 10\text{Stab3} - 10\text{Stab4} + 5\text{Stab5} - \text{Stab6} \text{ and}$$

$$D_7 = \text{Stab1} - 7\text{Stab2} + 21\text{Stab3} - 35\text{Stab4} + 35\text{Stab5} - 21\text{Stab6} + 7\text{Stab7} - \text{Stab8}$$

It will be understood by those skilled in the art that these equations are merely representative variations and embodiments of the mathematical technique and are not intended to limit the invention to any particular embodiment.

As discussed above, the present method is effective for discerning the stabilization peak even when there are high count rates above the stabilization peak, or where there is no well-defined valley between the logging spectrum and the stabilization peak. These conditions can be determined objectively, as for example when the number or fraction of counts above a certain threshold exceeds a preset limit, or, preferably, subjectively on the basis of the spectrum itself. For example, for purposes of the present discussion, the condition of high count rates above the stabilization peak can be defined as occurring when the amplitude of the s pectrum at a point 2W above the stabilization peak is greater than 20% of the maximum amplitude of the peak due only to the stabilization source. Likewise, for purposes of the present discussion, lack of a well-defined valley occurs when no portion of the spectrum between the stabilization peak and the logging peak is less than 40% of the maximum amplitude of the peak due only to the stabilization source. It will be understood that these conditions are merely descriptive of conditions under which the present technique will work; it is not necessary or preferred to determine their presence in actual operations.

It will be understood by those skilled in the art that it is preferred that the processes described be carried out iteratively and continuously during logging, such as, for example, every half-second. The frequency of the calculation can be varied, but is preferably at least once per minute.

While preferred embodiments of the present method have been disclosed herein, it will be understood that modifications thereof can be made by one skilled in the art without departing from the spirit of the invention.

What is claimed is:

1. A method for calibrating a logging tool that is exposed to an external energy spectrum, comprising the steps of:
   (a) providing a stabilization source that emits a stabilization signal having a known energy value;
   (b) providing a receiver that receives a total spectrum that comprises the sum of the external energy spectrum and the received stabilization signal;
   (c) adjusting the gain of the tool so that the received stabilization signal has said known energy value, by the steps of:
      (ci) ensuring that the received stabilization signal is within a preferred range of said known energy value;
      (cii) calculating a value $D_n$ that is proportional to a derivative of the spectrum at the stabilization peak energy, where n is the order of the derivative and is odd;
      (ciii) adjusting the gain of the tool on the basis of the value of $D_n$.

2. The method according to claim 1 wherein step (ci) is carried out by
   (ci) dividing said total spectrum into a plurality of adjacent windows, and
   (ci) evaluating the count rates in said windows.

3. The method according to claim 2 wherein step (ci) comprises comparing the count rate in the high end of the spectrum to the count rate of the total spectrum.

4. The method according to claim 2 wherein step (ci) comprises comparing the count rate within a predetermined range of a predicted stabilization peak to a predetermined expected value for said count rate.

5. The method according to claim 2 wherein step (ci) comprises comparing the count rate in a window Stab3 that is adjacent to and above a predicted stabilization energy to the count rate in a window Stab4 that is adjacent to and above Stab3.

6. The method according to claim 2 wherein step (ci) comprises comparing the count rate in a window Stab2 that is adjacent to and below a predicted stabilization energy to the count rate in a window Stab1 that is adjacent to and below Stab2.

7. The method according to claim 2 wherein step (ci) comprises comparing the count rate in a window Stab2 that is adjacent to and below a predicted stabilization energy to the count rate in a window Stab3 that is adjacent to and above said predicted stabilization energy.

8. The method according to claim 1 wherein step (ci) is carried out by:
   (ci) calculating the centroid of the area under the total spectrum; and
   (ci) adjusting the gain of the tool on the basis of the calculated centroid.

9. The method according to claim 8 wherein the centroid of the area under the total spectrum is calculated by defining a plurality of contiguous energy windows that together span a majority of the spectrum and calculating the centroid according to the following equation:

$$\text{centroid} = \frac{\sum_i y_i x_i}{\sum_i y_i}$$

where $x_i$ is the energy of window i and $y_i$ is the count rate in that window.

10. The method according to claim 1 wherein step (cii) is carried out by dividing a portion of the spectrum that includes the known energy level of the stabilization peak into a number of windows of equal width, with an equal number of windows on either side of the stabilization peak energy and calculating a value for $D_n$ using the count rates in each of the windows.

11. The method according to claim 10 wherein the number of windows is equal to (n+1).

12. The method according to claim 1 wherein n=3 and a value for $D_3$ is calculated according to the equation: $D_3$=Stab1−3Stab2+3Stab3−Stab4, where Stab1 through Stab4 are consecutive, contiguous windows of equal width defined such that the known stabilization peak energy lies between Stab2 and Stab3.

13. The method according to claim 1 wherein n=5 and a value for $D_5$ is calculated according to the equation: $D_5$=Stab1−5Stab2+10Stab3−10Stab4+5Stab5−Stab6, where Stab1 through Stab6 are consecutive, contiguous windows of equal width defined such that the known stabilization peak energy lies between Stab3 and Stab4.

14. The method according to claim 1 wherein n=7 and a value for $D_7$ is calculated a according to the equation: $D_7$=Stab1−7Stab2+21Stab3−35Stab4+35Stab5−21Stab6+ 7Stab7−Stab8, where Stab1 through Stab8 are consecutive, contiguous windows of equal width defined such that the known stabilization peak energy lies between Stab4 and Stab5.

15. A method for calibrating a logging tool that is exposed to an external energy spectrum, comprising the steps of:
   (a) providing a stabilization source that emits a stabilization signal having a known energy value;
   (b) providing a receiver that receives a total spectrum that comprises the sum of the external energy spectrum and the received stabilization signal;
   (c) adjusting the gain of the tool so that the received stabilization signal has said known energy value, by the steps of:
      (ci) calculating the centroid of the area under the total spectrum;
      (cii) adjusting the gain of the tool on the basis of the calculated centroid;
      (ciii) dividing a portion of the spectrum that includes the known energy value of said stabilization source into a number of windows of equal width, with an equal number of windows on either side of the known energy value;
      (civ) using the count rates in the windows established in step (ciii) to calculate a value $D_n$ that is proportional to the $n^{th}$ derivative of the spectrum at the stabilization peak energy;
      (cv) adjusting the gain of the tool on the basis of the value of $D_n$.

16. The method according to claim 15 wherein n equals 3.

17. The method according to claim 15 wherein the centroid of the area under the total spectrum is calculated by defining a plurality of contiguous energy windows that together span a majority of the spectrum and calculating the centroid according to the following equation:

$$\text{centroid} = \frac{\sum_i y_i x_i}{\sum_i y_i}$$

where $x_i$ is the energy of window i and $y_i$ is the count rate in that window.

18. The method according to claim 15 wherein the gain is adjusted in step (cii) by an amount proportional to the difference between the calculated centroid and a predicted nominal value for said centroid.

19. The method according to claim 15 wherein steps (ci) and (cii) are repeated until the centroid falls within a predetermined range that includes a predicted nominal value for said centroid.

$$\text{centroid} = \frac{\sum_i y_i x_i}{\sum_i y_i}$$

20. The method according to claim 15, further including the step of compensating for the lithology of the formation by calculating the ratio of the count rates in a pre-selected low-energy window to the count rate in a pre-selected high-energy window, and adjusting the gain on the basis of said ratio.

21. The method according to claim 15 wherein n=3 and $D_3$ is calculated according to the equation: $D_3$=Stab1−3Stab2+3Stab3−Stab4, where Stab1 through Stab4 are consecutive, contiguous windows of equal width defined such that the known stabilization peak energy lies between Stab2 and Stab3.

22. The method according to claim 15 wherein n=5 and a value for $D_5$ is calculated according to the equation: $D_5$=Stab1−5Stab2+10Stab3−10Stab4+5Stab5−Stab6, where Stab1 through Stab6 are consecutive, contiguous windows of equal width defined such that the known stabilization peak energy lies between Stab3 and Stab4.

23. The method according to claim 15 wherein n=7 and a value for $D_7$ is calculated a according to the equation: $D_7$=Stab1−7Stab2+21Stab3−35Stab4+35Stab5−21Stab6+7Stab7−Stab8, where Stab1 through Stab8 are consecutive, contiguous windows of equal width defined such that the known stabilization peak energy lies between Stab4 and Stab5.

24. The method according to claim 15 wherein steps (ciii)–(cv) are repeated until $D_n$ equals substantially zero.

25. The method according to claim 15 wherein the total spectrum includes high count rates above the stabilization peak.

26. The method according to claim 15 wherein the stabilization peak is superimposed on a large quadratic background.

27. The method according to claim 15 wherein there is no well-defined valley between the logging spectrum and the stabilization peak.

28. A method for calibrating a logging tool that is exposed to an external energy spectrum, comprising the steps of:

(a) providing a stabilization source that emits a stabilization signal having a known energy value;

(b) providing a receiver that receives a total spectrum that comprises the sum of the external energy spectrum and the received stabilization signal;

(c) adjusting the gain of the tool so that the received stabilization signal has said known energy value, by the steps of:

(ci) ensuring that the received stabilization signal is within a preferred range of said known value;

(cii) dividing a portion of the spectrum that includes the known energy level of the stabilization peak into a number of windows of equal width, with an equal number of windows on either side of the stabilization peak energy;

(ciii) using the count rates in the windows established in step (cii) to calculate a value $D_n$ that is proportional to the $n^{th}$ derivative of the spectrum at the stabilization peak energy;

(civ) adjusting the gain of the tool on the basis of the value of $D_n$; and (cv) repeating steps (cii)–(civ) until $D_n$ equals substantially zero.

29. The method according to claim 28, wherein step (ci) is accomplished by calculating the centroid of the area under the total spectrum and adjusting the gain of the tool on the basis of said calculated centroid, said centroid being calculated by defining a plurality of contiguous energy windows that together span a majority of the spectrum and calculating the centroid according to the following equation:

$$\text{centroid} = \frac{\sum_i y_i x_i}{\sum_i y_i}$$

where $x_i$ is the energy of window i and $y_i$ is the count rate in that window.

30. The method according to claim 15, further including the step of compensating for the lithology of the formation by calculating the ratio of the count rates in a pre-selected low-energy window to the count rate in a pre-selected high-energy window, and adjusting the gain on the basis of said ratio.

* * * * *